US007038792B2

(12) United States Patent  
Gorinevsky et al.

(10) Patent No.: US 7,038,792 B2  
(45) Date of Patent: May 2, 2006

(54) MEASUREMENT SYSTEM FOR ELECTROMAGNETIC RADIATION STRUCTURE

(75) Inventors: Dimitry Gorinevsky, Palo Alto, CA (US); Tristram T. Hyde, Severna Park, MD (US)

(73) Assignee: Honeywell International Inc., Morristown, NJ (US)

( * ) Notice: Subject to any disclaimer, the term of this patent is extended or adjusted under 35 U.S.C. 154(b) by 395 days.

(21) Appl. No.: 10/401,659

(22) Filed: Mar. 28, 2003

(65) Prior Publication Data

US 2004/0004725 A1     Jan. 8, 2004

Related U.S. Application Data

(60) Provisional application No. 60/368,500, filed on Mar. 28, 2002.

(51) Int. Cl.  
*G01B 11/24* (2006.01)

(52) U.S. Cl. ...................................... 356/601

(58) Field of Classification Search ........ 356/512–515, 356/521, 601  
See application file for complete search history.

(56) References Cited

U.S. PATENT DOCUMENTS

| 4,725,144 | A | 2/1988 | Nelson et al. |
| 4,816,759 | A | 3/1989 | Ames et al. |
| 4,825,062 | A | 4/1989 | Rather et al. |
| 5,109,349 | A | 4/1992 | Ulich et al. |
| 5,220,406 | A | 6/1993 | Kishner |
| 5,265,034 | A | 11/1993 | Breckenridge et al. |
| 5,410,410 | A * | 4/1995 | Yamazaki et al. .......... 356/601 |
| 6,163,381 | A | 12/2000 | Davies et al. |
| 6,201,230 | B1 | 3/2001 | Crowther et al. |
| 6,278,100 | B1 | 8/2001 | Friedman et al. |
| 6,486,831 | B1 | 11/2002 | Martorana et al. |
| 6,513,939 | B1 | 2/2003 | Fettig et al. |
| 6,738,199 | B1 | 5/2004 | Nishioka |
| 6,784,408 | B1 | 8/2004 | Cheung et al. |
| 2003/0147162 | A1 | 8/2003 | Bennett et al. |
| 2004/0150871 | A1 | 8/2004 | Yang |

FOREIGN PATENT DOCUMENTS

| EP | 0 546 811 A1 | 6/1993 |
| EP | 0 769 712 A1 | 4/1997 |
| EP | 0 802 438 A2 | 10/1997 |

* cited by examiner

*Primary Examiner*—Gregory J. Toatley, Jr.  
*Assistant Examiner*—Kara Geisel  
(74) *Attorney, Agent, or Firm*—Kurt A. Luther

(57) ABSTRACT

A measurement system is provided that facilitates the measuring of a shape of a flexible electromagnetic radiation structure. The measurement system includes a plurality of local sensors, a central sensor and a measurement processor. Each of the plurality of local sensors is configured to sense the position of a portion of the flexible electromagnetic radiation structure. The central sensor is configured to determine an overall shape of the flexible electromagnetic radiation structure. The measurement processor provides the ability to combine sensor data from the local sensors and sensor data from the central sensor to provide an accurate measurement of the shape of the flexible electromagnetic radiation structure.

15 Claims, 5 Drawing Sheets

MEASUREMENT SYSTEM FOR ELECTROMAGNETIC RADIATION STRUCTURE

CROSS REFERENCE TO RELATED APPLICATIONS

This application claims the benefit of U.S. Provisional Patent Application No. 60/368,500, filed Mar. 28, 2002.

FIELD OF THE INVENTION

The present invention generally relates to an electromagnetic radiation structure, and more particularly to methods and apparatus for measuring the shape of a flexible electromagnetic radiation structure.

BACKGROUND OF THE INVENTION

Electromagnetic radiation structures have numerous applications. These applications include, but are not limited to reflecting, collecting, receiving, and/or emitting radiation within the electromagnetic spectrum (e.g., Radio Frequency (RF), Ultra-Violet (UV), visible, and Infrared (IR) radiation). The electromagnetic radiation is reflected, collected, received, and/or emitted by electromagnetic radiation structures for numerous purposes, including, but not limited to, terrestrial science, surveillance, and exploration, space science, surveillance, and exploration, and terrestrial and/or space-based communication. Electromagnetic radiation structures have continued to evolve and improve to meet past, present and future requirements to accomplish the foregoing purposes and other purposes not specifically mentioned but known to those of ordinary skilled in the art.

Generally, electromagnetic radiation structures have been configured to utilize rigid structures. For example, a rigid structure is described in U.S. Pat. Nos. 5,109,349, 4,825,062, and 4,816,759, which are hereby incorporated by reference. More specifically, the rigid structure described in U.S. Pat. Nos. 5,109,349, 4,825,062, and 4,816,759, employs mirror segments that rigid and individually controllable with three linear actuators that adjust with respect to a rigid rear surface (i.e., each of the mirror segments are tilted with respect to the rigid rear surface). Each of the mirror segments has a sensor for measuring the positioning of the mirror segment with respect to the rigid rear surface (i.e., measuring the tilt of the mirror segment with respect to the rigid rear surface), and each of the mirror segments is individually controllable using tilt error data obtained from a sensor of each mirror segment and sensors of neighboring mirror segments. While this structure provides an accurate surface figure, there are attributes and characteristics introduced by the rigidity that are less than desirable and limiting.

For example, the rigid structure described in U.S. Pat. Nos. 5,109,349, 4,825,062, and 4,816,759, requires the rigid rear surface for positioning of the mirror segments. Therefore, this configuration is generally not applicable to flexible materials (e.g., light weight truss beams, membranes or films that are inherently non-rigid) that can be used to form electromagnetic radiation structures. In addition, tilt control of each mirror segment using tilt error data for a mirror segment and tilt error data for neighboring mirror segments as described in the foregoing patents assumes that the surface of the electromagnetic radiation structure is divided into separate and distinct segments, which are separately controllable and generally isolated from other segments. However, as flexible materials are generally unitary without distinct segments, positioning or movement of one portion of the flexible and lightweight film is likely to cause surface deformation that propagates to other portions of the material, and the prior art methods and apparatus for controlling the surface figure of the material are generally inadequate and will not provide the desirable accuracy.

In view of the foregoing, it should be appreciated that it would be desirable to provide an electromagnetic radiation structure that uses a deformable truss beam or a flexible membrane and also provide methods and apparatus for measuring the surface figure of a flexible material to provide a desired surface figure for electromagnetic radiation. Furthermore, additional desirable features will become apparent to one of ordinary skill in the art from the foregoing background of the invention and following summary and detailed description.

BRIEF SUMMARY OF THE INVENTION

In accordance with the present invention, a measurement system is provided for measuring the shape of a flexible electromagnetic radiation structure. The measurement system includes a plurality of local sensors, a central sensor and a measurement processor. Each of the plurality of local sensors is configured to sense the position of a portion of the flexible electromagnetic radiation structure. The central sensor is configured to determine at least a part of an overall shape of the flexible electromagnetic radiation structure. The measurement processor provides the ability to combine sensor data from the local sensors and sensor data from the central sensor to provide an accurate measurement of the shape of the flexible electromagnetic radiation structure.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

In accordance with the present invention, a measurement system is provided for measuring the shape of a flexible electromagnetic radiation structure. The measurement system includes a plurality of local sensors, a central sensor and a measurement processor. Each of the plurality of local sensors is configured to sense the position of a portion of the flexible electromagnetic radiation structure. The central sensor is configured to determine an overall shape of the flexible electromagnetic radiation structure. The measurement processor provides the ability to combine sensor data from the local sensors and sensor data from the central sensor to provide an accurate measurement of the shape of the flexible electromagnetic radiation structure.

The measurement system thus provides the ability to accurately measure the shape of a flexible electromagnetic radiation structure. This shape measurement can then be used to provide for dynamic control of the structure shape, or to compensate for errors in the shape using any suitable technique. Alternatively, it can be used in single processing of the electromagnetic radiation measurements.

Figure 1:
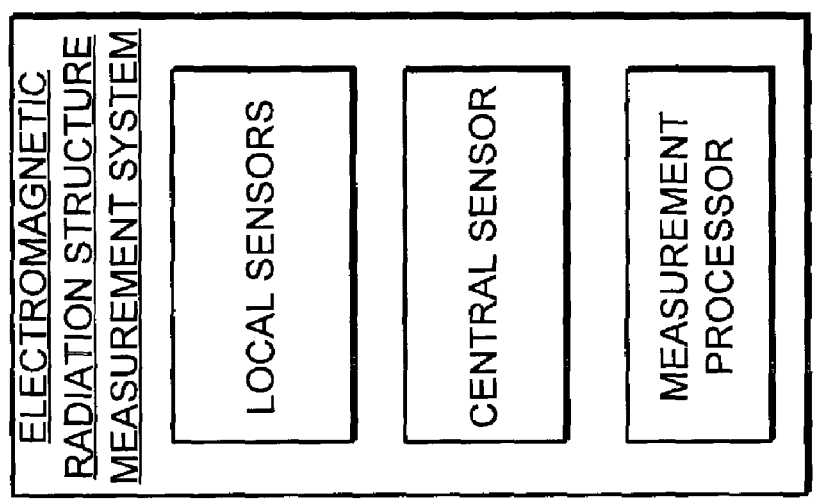
FIG. 1 is a schematic view of a measurement system for a flexible electromagnetic radiation structure.

Turning now to FIG. 1, a schematic view of a flexible radiation structure measurement system is illustrated. The measurement system includes a plurality of local sensors, a central sensor and a measurement processor. The plurality of local sensors are each configured to sense the position of a portion of the flexible electromagnetic radiation structure. The central sensor is configured to determine an overall shape of the flexible electromagnetic radiation structure. The measurement processor provides the ability to combine sensor data from the local sensors and sensor data from the central sensor to provide an accurate measurement of the shape of the flexible electromagnetic radiation structure.

In one example, the central sensor data is used to calibrate the offset of the local sensors. Thus, the central sensor data is used to assure that all of the local sensors are measuring from a common baseline. Using central sensor data to periodically update the offset of each local sensor provides the ability to compensate for drifts in the offset caused by changes in operational environment. This improves the accuracy of measurements taken by the local sensors. Thus, the measurement system provides the ability to accurately measure the shape of the radiation structure.

When the shape of the flexible electromagnetic radiation structure has been determined, this data can then be used to provide control of the structure shape using a suitable control system. Such a control system would typically include a plurality of actuators configured to control the structure shape, based on the shape data provided by the measurement system. In the alternative, instead of dynamically controlling the shape, the shape data can be used to respond to or compensate for changes in the shape using any suitable data processing technique. As one example, signal processing of the electromagnetic radiation measurements can be used for compensating the phase error caused by the displacement or antenna array elements in a phased array radar.

The measurement system can be used on any type of electromagnetic radiation structure that is deformable, comprises a flexible material or structural elements, where the flexible material or elastic structural element might deform or change the structure shape for any type of electromagnetic radiation. Thus, the electromagnetic radiation structure can be any number of electromagnetic radiation structures utilized for reflecting, collecting, receiving, and/or emitting radiation within the electromagnetic spectrum (e.g., Radio Frequency (RF), Ultra-Violet (UV), visible, and Infrared (IR) radiation). For example, the electromagnetic radiation structure can be a space reflector (e.g., a "gossamer" structure), or a phased array radar antenna such as a space-based TDRSS mesh deployed antenna, or telescope, among others. While these descriptions, and the descriptions set forth in U.S. patents incorporated herein by reference, describe specific examples of electromagnetic radiations structures, the present invention includes the specific examples, but is not limited thereto.

As one example, the electromagnetic radiation structure comprises a flexible material that is configured to provide a surface figure (e.g., a surface shape or surface contour) for reflecting electromagnetic radiation. The flexible material can comprise any number of materials or combinations of materials. For example, the flexible material can comprise a generally continuous and non-segmented material. In another embodiment, the flexible material can comprise multiple segments that are each coupled to at least one other segment (i.e., a neighboring segment). In this example, the segments can be coupled to at least one other segment using any number of techniques or the segments can be preferably formed of a unitary sheet or membrane. In a further variation of this example, the flexible electromagnetic radiation structure can comprise on array of rigid members, such as an array of micro-mirrors, with flexible coupling between the members to give the radiation structure shape flexibility.

As described above, the measurement system includes a plurality of local sensors and at least one central censor. Each of the plurality of local sensors is configured to measure the position or shape of a corresponding piece of the electromagnetic radiation structure. As one example, each of these sensors can be implemented to provide a measurement of the figure error for the radiation structure, where the figure error is a representation of how the shape of the structure at the local sensor differs from the desired shape. These local sensors can comprise any suitable sensor type. For on example a laser profiling sensor can be used to determine shape and position at corresponding locations in the structure. As another example, a wave front sensor (e.g., a Hartmann sensor) can be used in accordance with the present invention and U.S. Pat. Nos. 4,825,062 and 4,816,759 can be referred to for additional descriptions of other sensors that are generally suitable for determining the local deformation data.

The central sensor is configured to provide a measurement of all or a substantial part of the radiation structure. Thus, the central sensor can provide measurement of the figure error or shape for the electronic radiation structure. Any number of different devices and systems can be used as central sensors. For example, a Twyman-Green interferometer, a Shack-Hartmann sensor or an Electronic Speckle Pattern Interferometer (EPSI) or other laser surface profiling system can be used for measurement of the figure error of the electronic radiation structure.

The measurement processor provides the ability to combine sensor data from the local sensors and sensor data from the central sensor to determine the shape of the flexible electromagnetic radiation structure. It should be noted that the term measurement processor is not meant to be limited to one piece of hardware. Instead, the measurement processor can comprise a plurality of processors configured to work together. In one embodiment, the measurement processor comprises a plurality of local processors, with each local processor processing shape data from one or more local sensors in a section of the flexible radiation structure.

Figure 2:
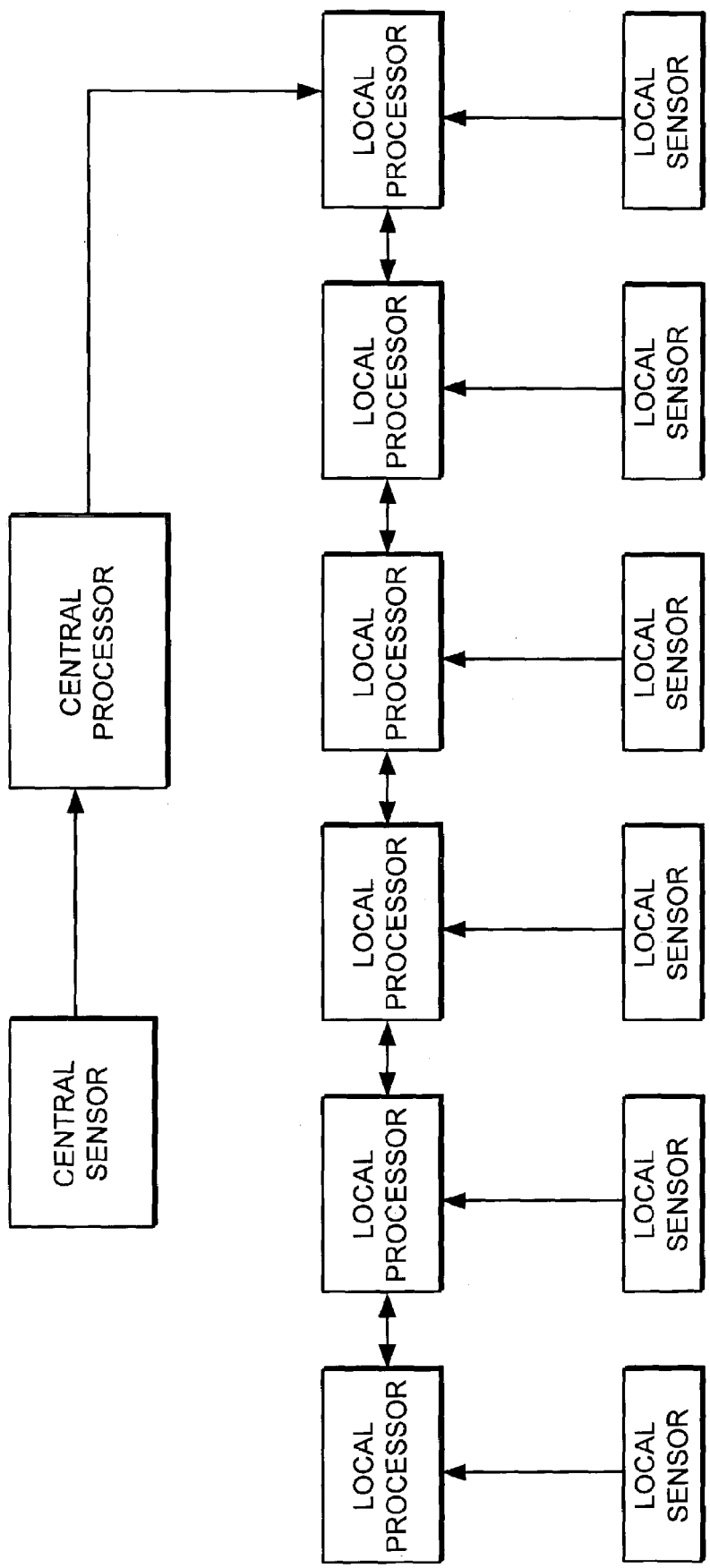
FIG. 2 is a block diagram of a flexible electromagnetic radiation structure measurement system.

Turning now to FIG. 2, a detailed example of a measurement system 200 will now be given. In measurement system 200, the measurement processor includes a plurality of local processors and a central processor. In this simplified example, each local processor receives measurement data directly from one local sensor. As described above, this is just one example, and in many cases it may be desirable to receive data from multiple sensors each local processor.

The local processors are coupled to each other to provide communication between neighboring processors. These connections between local processors also allow control and sensor data to be sent from the local processor to local processor, and additionally one to the central processor. Thus, the connections between cells can be used by local processors to communicate with the central processor, without requiring additional dedicated transmission buses that would add weight and reduce the reliability of the system. Thus, this communication technique allows local processors to communicate with neighbors at relatively high transmission rates, communicate with the central processor at a relatively lower rate, while minimizing system complexity and weight and maximizing fault tolerance.

It should be noted that while the example illustrates only six local processors and six local sensors, a typical application would have many more. For example, a large reflecting surface could use millions of local sensors, and likewise use millions of relatively simple local processors.

It should be noted that the plurality of local sensors can be arrayed in a variety of arrangements, with these arrangements typically depending upon the size, shape and general characteristics of the flexible electromagnetic radiation structure the sensors are employed to measure. For example, the sensors could be arrayed in single row for a "one-dimensional" structure such as a truss beam. In these applications the sensors would typically be distributed along the length of the structure. In a "two-dimensional" application such as a deformable surface, the sensors would typically be arranged in a two dimensional array to best measure the shape of the structure. Other applications would require that the sensors arranged in a three dimensional arrangement to provide full shape measurement in the three dimensional space.

In applications where data from the measurement system is used to control the shape of the flexible electromagnetic radiation structure, the system 200 could also include a plurality of actuators. For example, each local processor could control one or more actuators based on the measurement system data. Those actuators would each be configured to adjust the shape of one portion of the structure, and combined together can provide effective shape control over the system. Such as system is described in more detail in the copending patent application entitled "Electromagnetic Radiation Structure Control System" by D. Gorinevsky et al, Ser. No. 10/401,651, filed on Mar. 28, 2003 and assigned to Honeywell International Inc.

The measurement system 200 provides the ability to measure the shape of a flexible electromagnetic radiation structure. For purposes of this application, the flexible electromagnetic structure will be described as comprising a plurality of "cells", where each cell is a defined as a portion of the electromagnetic radiation structure. Dividing the flexible electromagnetic radiation structure into plurality of cells provides a conceptual framework for describing how the measurement system measures the shape of the structure. Specifically, the concept of cells will be used to describe how the changes in shape propagate through the radiation structure. As the term is used here, a cell may or may not correspond to any particular physical feature on the flexible structure. When the flexible electromagnetic radiation structure is a continuous non-segment material, the cells could comprise any defined shape pattern or method of dividing the structure into smaller portions. As another example, when the flexible electromagnetic radiation structure is comprised of multiple segments, it may be desirable to define each segment as a cell, although this may not always be the case. Cells may comprise any suitable shape and size, including geometric shapes such as hexagons, triangles and squares. Cells can be patterned in any suitable regular arrangement, including triangular, rectangular, and hexagonal grid.

Furthermore, as described above, each local processor receives measurement data from one or more neighboring cells in a section of the radiation structure. It is important to note a cell serviced by each processor can comprise one or more sensor measurements.

Figure 3:
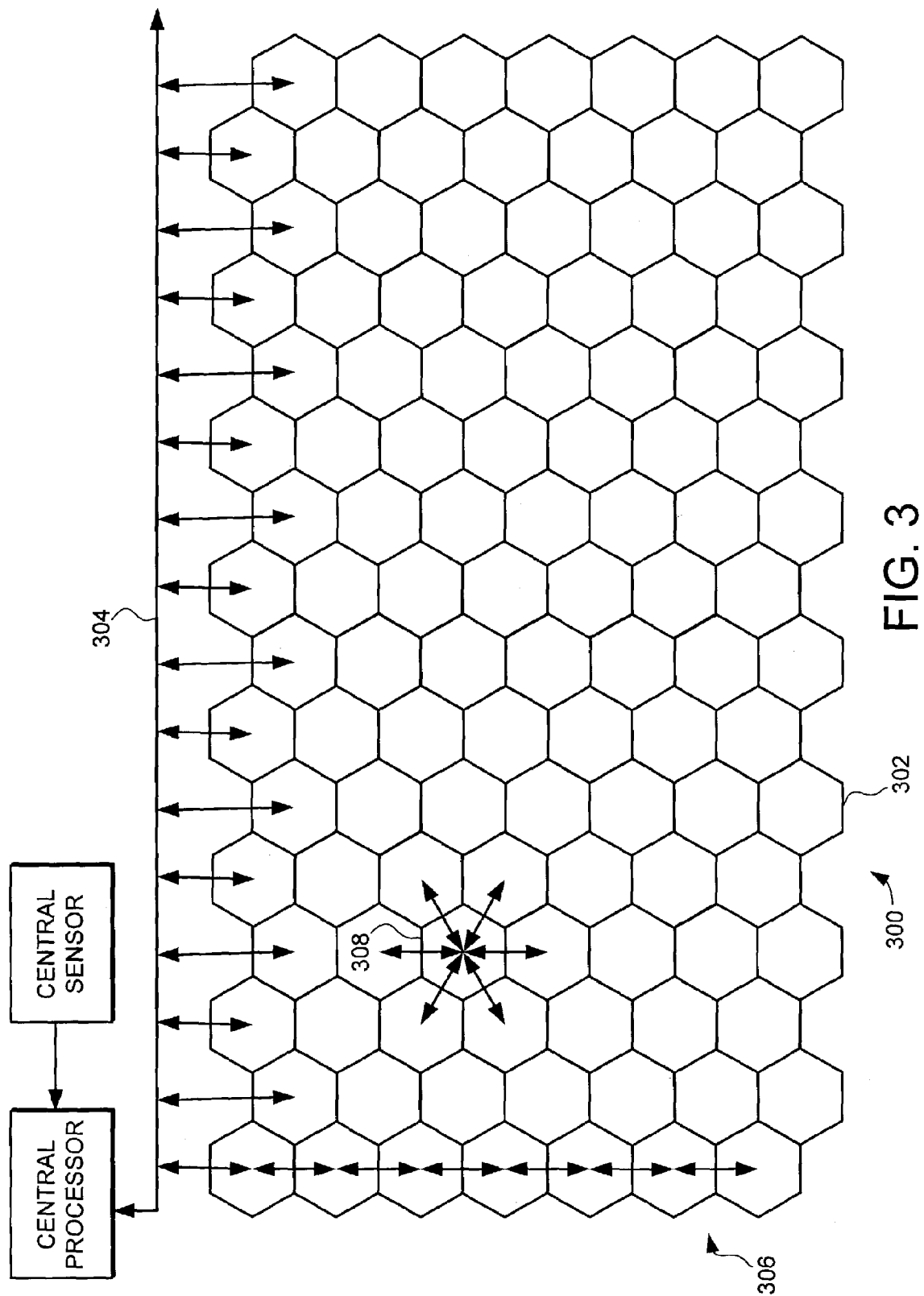
FIGS. 3–4 are schematic views of a portion of a flexible electromagnetic radiation structure.

Turning now to FIG. 3, a portion 300 of an exemplary flexible electromagnetic radiation structure is illustrated. The portion 300 includes a plurality of cells 302. In the example of a FIG. 3, the cells comprise hexagonal portions of the structure. Again, these cells may or may not correspond to any physical features on the structure. Not explicitly illustrated in FIG. 3 are the local processors and local sensors for each cell that would commonly be collocated within, or adjacent to, each cell, and the connection buses between each cell.

In this example it will again be assumed that each cell includes one local processor and one local sensor, although again this is but one example of a possible configuration.

Each of the cells in the array is coupled to its neighboring cells. As an example, the communication paths between cell 308 and each of its neighboring cells are illustrated in FIG. 3. The connections between cells facilitate communication between the local processors of each cell and the local processors its neighboring cells. This allows local processors to use sensor data and control data from the neighboring cells. Cells at the edge of the portion 300 are connected to a bus 304. Bus 304 allows the local processors in each of the edge cells to communicate with the central processor by passing data from cell to cell until the bus 304 is reach. As an example, the column of cells 306 is shown illustrating how a string of cells can be used to pass data from a local processor at the interior of the structure out to the bus 304 and finally to the central processor, and vice versa. This allows the local processors to receive data from the central processor, including data from the central sensor, although this data is provided and used at a lower rate than local and neighboring data. Again, each local processor can communicate with the central processor even though only a portion of the cells are actually directly connected to the bus 304.

Figure 4:
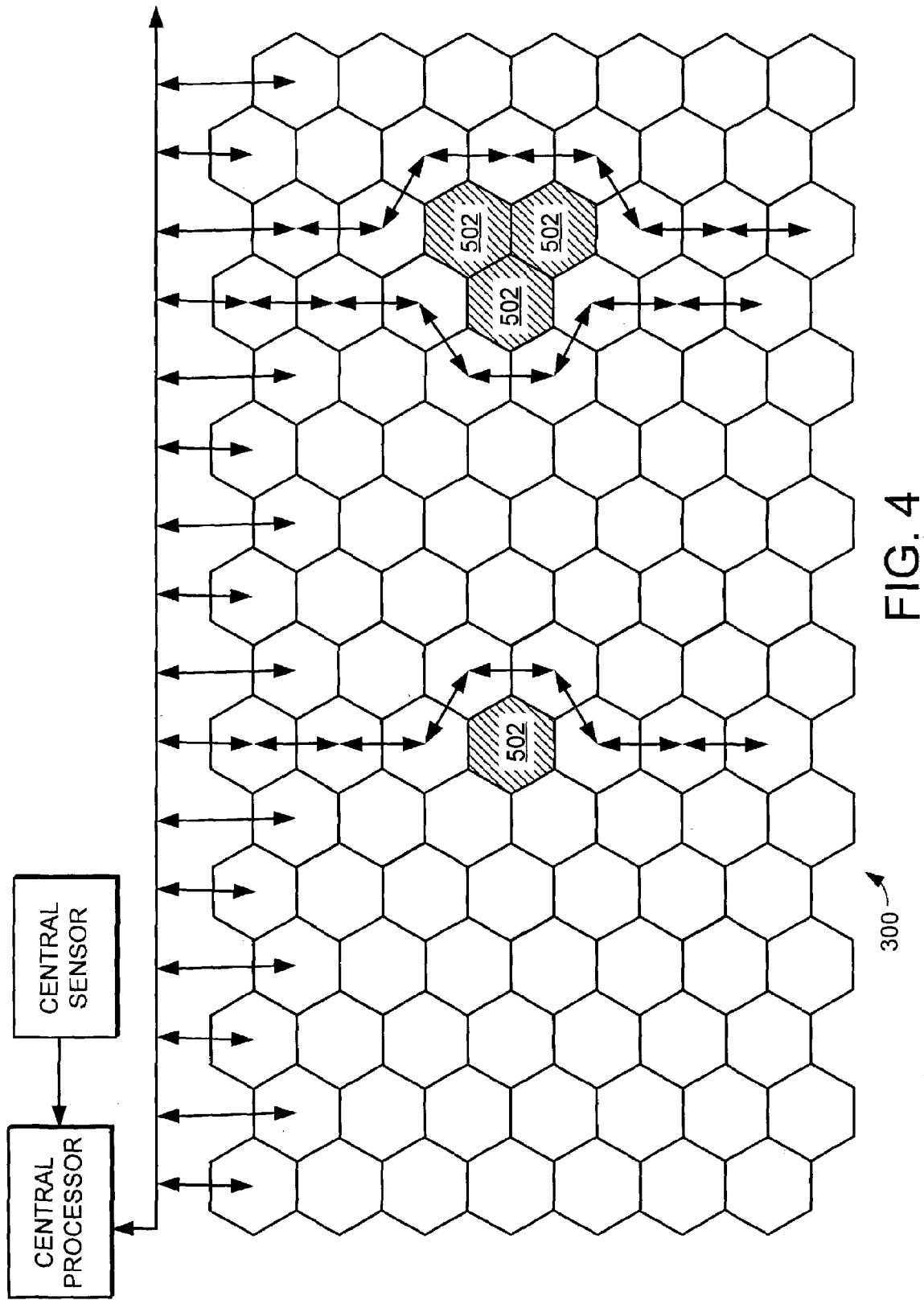

The distributed nature of the measurement system provides for improved fault tolerance and the ability to compensate for failures in individual cells. Turning now to FIG. 4, the flexible electromagnetic radiation structure portion 300 is illustrated showing several exemplary failed cells 502. These cells could fail for a variety of reasons, including problems with the local processor, or connections between cells. When failure in a cell occurs, it necessarily affects the ability of the system to measure the associated cell. However, the multiple connections between cells and neighbors can be used to minimize the effects of that failure. Specifically, by utilizing different connections between neighboring cells, communication paths between all the remaining good cells and the central processor can be maintained. FIG. 4 illustrates three examples of modified communication paths that bypass the failed cells 502 and provide communication to the remaining cells. It should also be noted that failure of cells 502 may affect the ability of neighboring cells to get sensor and control data from that cell. It is thus desirable to configure the local processors to compensate for the loss of sensor and control data from dead cells to maintain effective measurement, to the extent that this is possible.

As described above, the measurement system includes a plurality of local sensors that are each configured to sense the position of a portion of the flexible electromagnetic radiation structure, and a central sensor a configured to determine an overall shape of the flexible electromagnetic radiation structure. The measurement processor provides the ability to combine sensor data from the local sensors and sensor data from the central sensor to determine the shape of the flexible electromagnetic radiation structure as it is changing in real-time, in particular during elastic vibrations caused by slewing or other disturbances.

As described above, the central measures the overall shape of the electromagnetic radiation structure using any of a variety of methods. The central sensor data is then mapped to association the central sensor data with the appropriate corresponding cells. That portion corresponding to the each individual cell can then be sent to the local processor through the network of cells. Because of the time required to map the central sensor data and send it through the network to the local sensors, the mapped central sensor data is typically received at the local processor at a much lower rate than the local sensor data. For example, the mapped central data may only be received at the local process once each second, while in contrast, the local and neighbor sensor data can be provided to the local processor multiple times per second.

Although updated at a lower rate, the mapped central sensor data can provide information that is not readily available from the local and neighboring sensors. For example, it can provide a measurement of overall shape of the structure. Additionally, in some circumstances the central sensor can provide more accurate measurements of the structure shape. Thus the central sensor can be used to account for shape distortions caused by thermal drift, and determine errors that occur during initial deployment.

In one example, the central sensor data is used to calibrate the offset of the local sensors. Thus, the central sensor data is used to assure that all of the local sensors are measuring from an appropriate baseline. Using central sensor data to periodically update the offset of each local sensor provides the ability to compensate for drifts in the offset caused by changes in operational environment such as temperature changes.

Figure 5:
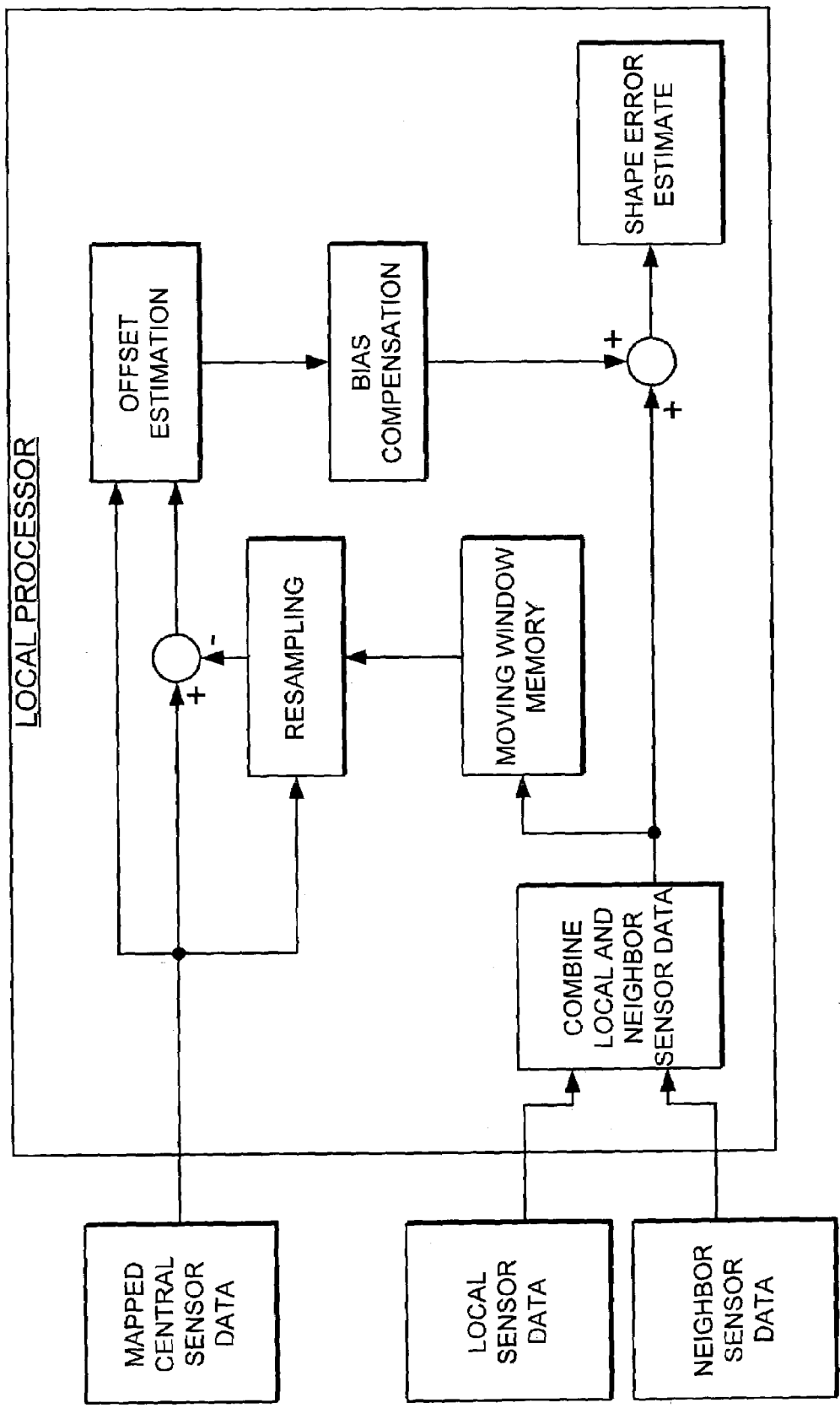
FIG. 5 is a block diagram view of a local measurement processor implementation.

The preferred measurement system combines the accuracy and overall measurements provided by the central sensor with the high resolution, high rate measurements provided by the array of local sensors. Turning now to FIG. 5, a schematic diagram 700 showing an exemplary process for combining data from these disparate sources and generating a shape error estimate is illustrated. This operation would be performed by each local processor in distributed measurement system. In this example, each local processor receives mapped central sensor data from the central sensor and local sensor data from the sensor in the corresponding cell. In addition, local sensor data from neighboring cells is also provided. The combination of data allows the use of disparate sources of information to most accurately determine the control needs of the system.

In this example, the central sensor data is used to calibrate the offset of the local sensors. Thus, the central sensor data is used to assure that all of the local sensors are measuring from an appropriate baseline. Using central sensor data to periodically update the offset of each local sensor provides the ability to compensate for drifts in the offset caused by changes in operational environment.

In process 700, the local processor receives sensor data from the local sensor and local sensors in neighboring cells. The data from the local and neighboring cells is combined using any suitable combination procedure. For example, the local and neighboring sensor data can be combined using a weighted linear combination technique that gives more weight to the local sensor and close neighbor sensors then it does to more remote sensors. In an alternative embodiment, data from neighboring cells be eliminated and the process applied to data only from the local cell.

The local and neighbor sensor data combination is passed to a moving memory window that provides temporary storage of the data. Specifically, the moving window memory stores the local and neighbor sensing data from a set previous time period, such as the previous ten seconds of time. The data is stored to allow the mapped central sensor data to be combined with local data from the same time period. Again, because the mapped central sensor data is passed through the network to reach the local processor, there is some delay before it arrives at the local processor. The moving window memory stores local data from previous time periods to allow the mapped central data to be combined and compared with local data from the same time. The moving window memory passes the local data to the resampling block element as needed.

The resampling block can be implemented as software, hardware and/or firmware. The resampling block resamples the data from the moving window memory to facilitate combination with the mapped central sensor data. This resampling can include the ability to interpolate data to provide for correct time combinations. For example, if local sensor data is available from eight seconds ago and from ten seconds ago, but the central sensor data is available only for nine seconds ago, the resampling element can interpolate old values at the ten or eight seconds to generate data that can be compared against and combined with the nine second old central sensor data. Thus, resampling can be used to facilitate the combination of local and central sensor data from the same time instance. This is desirable because changes in shape would otherwise make accurate comparisons impossible.

The resampled local data is then subtracted from the mapped central sensor data from the same time period. That subtracted data is sent to the offset estimation element. The offset estimation element estimates the difference between the local sensor data and the central sensor data. The offset estimation is used to adjust the offsets of the local sensor. Using central sensor data to periodically update the offset of each local sensor provides the ability to compensate for drifts in the offset caused by changes in operational environment.

One type of suitable mechanism that can be used for offset estimation is a Kalman filter. Kalman filters are processing tools that can be used to combine or fuse in an optimal way different types of data from different sources describing the same system. As such, the Kalman filter can be used to compensate the offset of the local sensor based on sensor data from the central sensor.

As stated above, the offset estimation determines how the offset of the local sensor is compared to a baseline determined by the central sensor. From this offset estimation, it can be determined by the bias compensation element how much the local sensor data measurements need to be adjusted to compensate for changes in the operational environment. This bias compensation value is then added to the local and neighbor sensor data to provide a compensated shape error estimate.

By periodically applying the compensation system illustrated in FIG. 7 to all the local sensors in all of the cells, the offset of each local sensor can be set its appropriate baseline. Thus, the accuracy and reliability of the local sensor system is improved and drift in local sensor data is reduced or eliminated. When the local sensor data is used as a shape error estimate in determining actuator set points, the offset calibration ensures that the actuator set points are determined from the common baseline. Of course, this is only one example of how local sensor data and central sensor data can be combined to provide accurate shape data.

The invention thus provides a measurement system or measuring the shape of a flexible electromagnetic radiation structure. The measurement system includes a plurality of local sensors, a central sensor and a measurement processor. The plurality of local sensors are each configured to sense the position of a portion of the flexible electromagnetic radiation structure. The central sensor is configured to determine an overall shape of the flexible electromagnetic radiation structure. The measurement processor provides the ability to combine sensor data from the local sensors and sensor data from the central sensor to provide an accurate measurement of the shape of the flexible electromagnetic radiation structure.

From the foregoing description, it should be appreciated that an electromagnetic radiation structure and methods and apparatus for measuring the surface figure of a flexible material of an electromagnetic radiation structure are provided in accordance with the present invention that present significant benefits that would be apparent to one or ordinary skill in the art. Furthermore, while a preferred exemplary embodiment has been presented in the foregoing detailed description, it should be appreciated that a vast number of variations in the embodiments exist, including, but not limited to an electromagnetic radiation structure formed of separate rigid segments, such as a 2-D array of MEMS micro-mirrors. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in this detailed description of the drawings without departing from the spirit and scope of the invention.

The invention claimed is:

1. A measurement system for measuring a shape of a flexible electromagnetic radiation structure, the measurement system comprising:
   a) a plurality of local sensors, each of the plurality of local sensors measuring a position of a portion of the flexible electromagnetic radiation structure and providing local sensor data indicative of the position;
   b) a central sensor, the central sensor measuring at least a part of an overall shape of the flexible electromagnetic radiation structure, the central sensor providing central sensor data indicative of the at least a part of an overall shape;
   c) a measurement processor, the measurement process combining the local sensor data from the plurality of local sensors and the central sensor data from the central sensor to determine the shape of the flexible electromagnetic radiation structure, and wherein the measurement processor comprises a plurality of local processors, with each of the plurality of local processors receiving local sensor data from at least one of the plurality of local sensors, and wherein each of the plurality of local processors is adjacent to a corresponding section of the flexible electromagnetic radiation structure.

2. The measurement system of claim 1 wherein the measurement processor combines the local sensor data from the plurality of local sensors and the central sensor data by utilizing the central sensor data to determine an offset for the at least one of the plurality of local sensors based on the central sensor data.

3. The measurement system of claim 1 wherein each of the plurality of local processors receives a mapped portion of the central sensor data for the corresponding section of the flexible electromagnetic radiation structure.

4. The measurement system of claim 1 wherein the measurement processor includes an offset estimation element to element to estimate an offset of the local sensor based on the central sensor data.

5. The measurement system of claim 4 wherein the offset estimation element comprises a Kalman filter.

6. The measurement system of claim 1 wherein the measurement processor includes a moving window memory to store local sensor data to facilitate combining of the central sensor data and the local sensor data when the central sensor data is provided at a different rate than the local sensor data.

7. The measurement system of claim 1 wherein the plurality of local sensors comprise wave front sensors.

8. The measurement system of claim 1 wherein the central sensor comprises an interferometer.

9. The measurement system of claim 1 wherein the central sensor comprises a Shack-Hartmann sensor.

10. The measurement system of claim 1 wherein the local sensor data comprises cell sensor error indicating a difference between a current position and a desired position.

11. The measurement system of claim 1 wherein the measurement processor includes a plurality of moving window memories to store local sensor data to facilitate combining of the central sensor data and the local sensor data when the central sensor data is provided at a different rate than the local sensor data.

12. A measurement system for measuring a flexible electromagnetic radiation structure, the measurement system comprising:
   a) a plurality of local sensors, each of the plurality of local sensors measuring a position of a portion of the flexible electromagnetic radiation structure and providing local sensor data indicative of the position; and
   b) a central sensor, the central sensor measuring at least a part of an overall shape of the flexible electromagnetic radiation structure, the central sensor providing central sensor data indicative of the at least a part of an overall shape; and
   c) a measurement processor, the measurement processor receiving the position data from the plurality of local sensors and the central sensor data, the measurement processor determining an offset for each of the plurality of local sensors based on the central sensor data.

13. The measurement system of claim 12 wherein the measurement processor comprises a plurality of local processors, with each of the plurality of local processors receiving local sensor data from at least one of the plurality of local sensors corresponding to a section of the flexible electromagnetic radiation structure, and with each of the plurality of local processors receiving a mapped portion of the central sensor data corresponding to the corresponding section of the flexible electromagnetic radiation structure.

14. The measurement system of claim 12 wherein the measurement processor includes a plurality of Kalman filters, each of the plurality of Kalman filters determining the offset for at least one of the plurality of local sensors based on the central sensor data.

15. A measurement system for measuring a flexible electromagnetic radiation structure, the measurement system comprising:
   a) a plurality of local sensors, each of the plurality of local sensors measuring a position of a portion of the flexible electromagnetic radiation structure and providing local sensor data indicative of the position; and
   b) a central sensor, the central sensor measuring at least a part of an overall shape of the flexible electromagnetic radiation structure, the central sensor providing central sensor data indicative of the at least a part of an overall shape; and
   c) a plurality of local processors, each of the plurality of local processors receiving local sensor data from at least one of the plurality of local sensors corresponding to a section of the flexible electromagnetic radiation structure, and with each of the plurality of local processors receiving a mapped portion of the central sensor data corresponding to the corresponding section of the flexible electromagnetic radiation structure, and wherein each of the plurality of local processors includes a plurality of Kalman filters, each of the plurality of Kalman filters determining an offset for at least one of the plurality of local sensors based on the mapped portion of the central sensor data.

* * * * *